IRRADIATION OF POLYMERIC COMPOUNDS

Donald A. Guthrie, Cranford, N.J., assignor to Esso Research and Engineering Company, a corporation of Delaware
No Drawing. Filed Oct. 30, 1959, Ser. No. 849,753
9 Claims. (Cl. 204—162)

This invention relates to the irradiation of polymeric compounds. In one aspect it relates to a method for selectively reducing the molecular weight of polymers and copolymers of isobutylene in the presence of halogen-containing organic compounds by exposing such mixtures to radiation emitted by radioactive materials. In another aspect it concerns the simultaneous depolymerization and halogenation of the aforementioned polymers.

The preparation and uses of polymers and copolymers of isobutylene are well known. High molecular weight polymeric compounds made with isobutylene are extensively utilized as a replacement for natural rubber and are also utilized, for example, in the formulation of adhesive compounds such as pressure-sensitive tapes, cements, as a binder in caulking compounds, as a modifier in petroleum asphalts and the like. Also, polymers of isobutylene and copolymers of isobutylene (containing a high isobutylene content) which have viscosity average molecular weights in the range of about 45,000 to 220,000 are utilized extensively as viscosity index improvers for lubricating oils. Similar polymeric compounds having molecular weights above about 250,000 are not generally used as viscosity index improvers in lubricating oils as they suffer from the drawback that they degrade severely and lose much of their viscosity index improving properties when subjected to the high rates of shear which lubricating oils are normally expected to withstand.

Currently, high molecular weight polymeric substances containing large amounts of isobutylene and having high molecular weights (in the range of 225,000 to 6,000,000) are depolymerized or degraded to produce viscosity index improvers having molecular weights in the range of about 45,000 to 220,000. Viscosity index improvers produced in this manner are at least equivalent in shear stability to those produced by direct polymerization. For instance, butyl rubber (a copolymer comprising a major proportion of monoolefin and a minor proportion of a diolefin) having a viscosity average molecular weight in the range of about 225,000 to 6,000,000 is generally subjected to severe heat, chemical and mechanical molecular weight degradation to produce lower molecular weight compounds which are useful as viscosity index improvers. However, this treatment causes color degradation in the product, and requires expensive equipment and high maintenance costs. Also, Vistanex (isobutylene homopolymer) having a molecular weight in the range of about 225,000 to 6,000,000 has heretofore been dissolved in mineral oil and subjected to high shearing conditions to lower its molecular weight and thus convert the polymer into a viscosity index improver of suitable shear stability. This method has not been successful commercially due to the inability of conventional apparatus to provide continually the excessive shearing rates and turbulent flow conditions required.

It has now been found that the molecular weight of polymers and copolymers of isobutylene may be adjusted downwardly by exposing such polymeric compounds in admixture with halogenated hydrocarbons to ionizing radiation.

Moreover, it is sometimes desirable to introduce active groups in the relatively inert isobutylene-containing polymers to permit modification of them and improve their curing properties. This has been accomplished heretofore by reacting the polymers with small amounts of chlorine or bromine. The halogenated polymers not only cure faster but they also are more resistant to heat, aging, solvents, etc. By employing perhalogenated substances in the present process it is possible to not only reduce the polymer's molecular weight but also modify it with halogen.

In general the molecular weights of the polymeric compounds are reduced by at least about 1% when treated in accordance with the present process. However, if desired, smaller reductions may be obtained especially with lower molecular weight polymers, e.g. 5,000–30,000, by employing milder conditions. The invention may be used to produce specification butyl rubber, Vistanex and the like from off-specification products which have undesirably high molecular weights. This irradiation method may be employed to prepare viscosity index improvers for lubricating oils by reducing the molecular weight of high molecular weight polymers and copolymers of isobutylene and/or to modify such polymers by introducing significant amounts of halogen into them.

The polymers prepared in accordance with the present invention are superior to those prepared by the prior art methods (including those additives prepared by direct polymerization and by molecular weight degradation). For instance, th ecolor of the polymer product is superior to those prepared from the same initial isobutylene polymer by conventional milling processes. Other advantages of the present invention include: a lower cost process than conventional molecular weight degradation processes, a catalyst-free process and the ability to closely control the molecular weight of the product by simply adjusting the radiation dosage and concentration of the halogenated hydrocarbon. Other processes often have great difficulty maintaining the desired level of breakdown.

It has been found that liquid halogenated hydrocarbons greatly improve irradiation energy utilization and thus make this method commercially attractive as opposed to other processes which have a much lower efficiency. Moreover as mentioned above, certain halogenated materials will introduce halogen into the polymer while others will not. Broadly speaking, halogenated hydrocarbons having the following formula may be employed in the practice of the invention:

$$C_a H_b X_c$$

wherein "C" is carbon; "H" is hydrogen; "X" is chlorine, bromine, iodine or a mixture thereof; "$a$" is 1 to 6, preferably 1 to 2; "$b$" is 0 to 13, preferably 0 to 5; and "$c$" is 1 to 14, preferably 1 to 6. Compounds coming within the scope of this invention may be generically described as lower molecular weight halogenated aliphatic and alicyclic hydrocarbons. Among the halogen compounds which are useful in carrying out the invention are carbon tetrabromide or tetrachloride, methyl chloride, bromoform, chloroform, bromotrichloromethane, dichloromethane, 1,1- or 1,2-dichloroethane, 1,2,3,4-tetrabromobutane, 2,3-dichloropentane, chlorocyclohexane, dichlorocyclohexane, dibromocyclopentane and tribromopropane.

The isobutylene polymers employed in the present invention should contain at least about 5 wt. percent isobutylene. Preferably, they contain at least 40 wt. percent isobutylene and particularly preferred polymeric compounds contain about 95 to 99 or 100 wt. percent of isobutylene. Preferred polymeric compounds are a homopolymer of isobutylene and butyl rubber which is an isobutylene-$C_4$ to $C_6$ diolefin copolymer containing a major proportion of isobutylene and a minor proportion of diolefin, e.g. isoprene. Other isobutylene copolymers which may be employed include Parapol-S, which is a copolymer of isobutylene and styrene (generally containing about 20–60 wt. percent of the isobutylene component)

and copolymers of isobutylene with vinyl toluene, vinyl ethers, butadiene, maleic anhydride, vinyl trichlorosilane, acrylonitrile, etc.

The molecular weight of the polymeric compounds useful in this invention is generally in the range of about 5,000 to 6,000,000 or higher. Normally, the polymeric compounds irradiated in accordance with the present invention have viscosity average molecular weights in the range of about 5,000 to 2,000,000. The preparation of these polymers and copolymers of isobutylene is well known in the art.

The above-mentioned polymers, which should be admixed with a substantial amount (e.g. at least 5 wt. percent) of the specified halogenated solvents, are readily depolymerized by exposure to radiation doses of about 50,000 to 5,000,000 roentgens per hour. In most instances, it is desirable to dissolve the polymer in the solvent to make a 1 to 50 wt. percent solution prior to the radiation treatment; however, when the principal object is to modify the polymer, smaller amounts of solvent may be used, i.e. 5-20 wt. percent solvent and 80-95 wt. percent polymer. Of course, the solubility of the polymers vary and therefore some polymer solutions may be difficult to pump at the higher concentrations. In general it will be found that 1 to 10 wt. percent polymer solutions are suitable for continuous processes where pumping and agitation are usually necessary. Because the solvents of the present invention have such a high energy utilization, one can depolymerize to a given level at a rate which is 2 to 4 times faster than the rate noted with hexane solutions of the same polymers.

If the halogenated solvent is perhalogenated, that is to say it has no hydrogen atoms attached to carbon atoms, then the polymer will also be modified with halogen groups during the irradiation step. A particularly useful solvent in this regard is bromotrichloromethane. When isobutylene polymers admixed with this compound are exposed to ionizing radiation, the resulting polymers may contain up to about 10 wt. percent bromine although in most cases the amount of combined bromine will be about 0.5 to 3 wt. percent. Similarly with carbon tetrachloride, up to about 5 wt. percent of chlorine may be introduced into the polymer by irradiation. It has been noted that small amounts of halogen, e.g. 0.5 to 3 wt. percent, in the polymer substantially improve its properties and reactivity. On the other hand, if the solvent is chloroform, the irradiated polymer will be halogen free. Thus by selecting the appropriate solvent or halogenated liquid it is possible to produce different results.

Among the types of radiation that are suitable for the purposes of the invention are high energy electromagnetic radiation such as gamma rays and X-rays and high velocity electrons, as well as beta rays, alpha particles, and neutrons. These types of radiation can be supplied by naturally occurring radioactive materials or by common neutron sources. Fission by-products of processes generating atomic power or fissionable materials which emit high energy gamma rays afford a highly desirable and most abundant source of radioactivity suitable for the purposes of invention.

Irradiation can also be obtained from nuclear reactors such as atomic piles. In this form of the invention wherein neutrons are used, it is preferred that the neutron flux in the radiation zone be above $10^8$ neutrons/cm.$^2$/second besides maintaining an appreciable gamma-ray dosage. Conventional moderators can, of course, be used, such as water, carbon, and hydrocarbons. In some cases the feed stream itself can serve as a moderator. Materials made radioactive by exposure to neutron irradiation, such as radioactive cobalt-60 which emits gamma rays can likewise be used. Suitable sources of high velocity electrons are the beams of electron accelerators such as the Van de Graaff Electrostatic Accelerator. In general, however, high velocity electrons, high energy gamma rays and neutrons are preferred for the purposes of this invention, mainly because of the high penetrating power of these rays and/or the availability and ease of application of these sources of energy. By high energy ionizing radiation is meant, the radiation from terrestrial sources of sufficient energy that the dose rate is at least $1 \times 10^{-4}$ kwh. per pound of hydrocarbon reactant per hour. This excludes radiation such as cosmic and ultraviolet which are ineffectual for the purposes of this invention.

The reduction in the molecular weight and modification of the polymeric compounds by exposure to radiation is a function of the radiation dosage (roentgens). More specifically, the reduction in molecular weight will be a function of the rate of radiation (roentgens per hour) and the time of radiation (hours). Generally, radiation intensities of about 50,000 to greater than 5,000,000 roentgens per hour will be employed. Certain polymeric compounds, such as butyl rubber, for example, may contain small amounts of stabilizers, such as zinc stearate. Additives such as these may reduce the degree of molecular weight reduction for a given dosage of radiation as compared to the same polymeric compounds when they are essentially free of such substances. In such cases, higher dosages of radiation (i.e., longer irradiation times and/or greater irradiation intensities) would be required to produce an equivalent reduction in molecular weight.

Radiation sources having in the range of about 50 curies to 1,000 kilocuries, for example, are generally employed, although sources having lesser or greater amounts of radiation may be employed if desired. Irradiation times of about 0.5 to 24 hours are preferred. However, longer and shorter radiation times may be used depending upon the strength of the sources of radiation and the degree of molecular weight reduction desired.

The reduction in molecular weight desired will depend, of course, upon the molecular weight of the original polymeric compound and the desired molecular weight of the final irradiated product. If the irradiation is to be employed to produce specification butyl rubber, Vistanex, etc., the amount of reduction in molecular weight may be quite small if the off-specification material irradiated has a molecular weight only slightly in excess of the specification molecular weight. On the other hand, if high molecular weight polymeric compounds, such as those having molecular weights above 1,500,000, are to be reduced in molecular weight to 45,000 to 220,000 a substantial decrease in molecular weight is involved. In general, the degree of reduction in molecular weight involved in producing viscosity index improvers will be at least about 5% and generally at least about 25%. If desired, the irradiation of the polymeric compound may be continued until the molecular weight of the compound is reduced to about 5,000. Polymeric compounds of isobutylene which have viscosity index improving properties have viscosity average molecular weights in the general range of about 7,000 to 500,000. Preferred viscosity index improvers have molecular weights in the range of about 45,000 to 220,000.

In a preferred method of carrying out the method of the present invention, the polymeric compound to be irradiated is in the form of a 20-30 wt. percent solution in a suitable halogen-containing solvent, for example, chloroform. It is advantageous to stir the polymer solution during treatment to insure uniformity. The use of substantial quantities of solvent facilitates the handling of the polymeric compound in the irradiation process because the more dilute solutions can be easily pumped to and from the radiation source. After irradiation, the solvent, which is usually more volatile than the product, may be flashed or stripped from the polymeric product. The amount of irradiation required for a given degree of reduction in molecular weight for a particular polymer will vary depending upon the solvent selected since some solvents are more effective than others.

Normally the irradiation will be carried out at atmospheric temperatures and pressures, although temperatures in the range of about −20 to 150° C. may be employed. Of course the reactions usually proceed at a faster rate at the higher temperatures. At temperatures below about −20° C. the solution of the polymer may become quite thick and unpumpable. On the other hand, at temperatures above about 150° C., thermal decomposition of the polymer and volatilization of the solvent may be encountered. Superatmospheric pressures, e.g. up to 20 atmospheres, are necessary when using low boiling solvents, such as methyl chloride, to maintain a liquid mixture. Subatmospheric pressures may also be employed where it is expedient to use them.

The molecular weight ($M_V$) may be determined in several ways. One way of determining the molecular weight is by the viscosity method. One type of molecular weight determined by this method is known as the viscosity average molecular weight and this molecular weight is used herein. In this method the molecular weights of polymeric substances are expressed by the formula:

$$[\eta] = k M_V^a$$

where $M_V$ represents the viscosity average molecular weight; $k$ and $\alpha$ are constants depending on the solvent and polymer type; and $[\eta]$ represents the intrinsic viscosity which is defined by the following equation:

$$[\eta] = \frac{23.03 \times \log \frac{\text{viscosity of solution}}{\text{viscosity of solvent}}}{\text{mg. of polymer per ml. of solution}}$$

This method is well known in the art and is set forth on pp. 308–314 of the book "Principles of Polymer Chemistry," by P. J. Flory, published by Cornell University Press, Ithaca, N.Y. (1953). Number average molecular weights ($M_N$) of polyisobutylenes can be estimated from the following relation with the above viscosity average molecular weight ($M_V$):

$$M_V = 1.83\, M_N$$

Generally it has been observed that butyl rubber and Vistanex depolymerize respectively about 3 times and 6 times more readily than the most unstable copolymer of styrene and isobutylene containing about 50 wt. percent of isobutylene. Other styrene-isobutylene copolymers containing progressively more of the styrene component require increasing amounts of radiation to effect the same decrease in molecular weight.

The exposure of the polymeric compound to the radiation from the radioactive materials may be carried out either in a batch operation or a continuous operation. It is important in either operation, in order to obtain the most desirable results, to irradiate the polymeric compound uniformly. Thus viscosity index improvers produced by substantially uniform irradiation will be superior in shear stability to viscosity index improvers prepared utilizing less uniform conditions of irradiation. There are a number of different ways in which the irradiation may be carried out which will be obvious to those skilled in the art. For example, a solution of the polymeric compound in a shielded container may be irradiated by suspending a radiation source in the solution. Also, if desired, the solution of the polymeric compound may be introduced into a container surrounded by a source of radiation. In a continuous process of irradiation, the solution of the polymeric compound may be pumped continuously through a conduit placed in the source of radiation. For example, the solution may be passed through a conduit immersed in an underground pit filled with fission products of atomic piles, or the solution may be continuously pumped at a uniform rate through an atomic reactor where the solution will be irradiated with gamma rays and neutrons produced in the atomic reactor. Other methods will be apparent to those skilled in the art.

The invention will be more fully understood by reference to the following examples. It is pointed out, however, that the examples are given for the purpose of illustration only and are not to be construed as limiting the scope of the present invention in any way.

EXAMPLE 1

Solutions of polyisobutylene having a number average molecular weight of $1.13 \times 10^6$ were prepared with either chloroform or hexane as the solvent. The samples were placed in glass ampoules approximately one and a half to two centimeters in diameter and 6 centimeters in length. Each ampoule was then sealed and placed inside an aluminum canister which in turn was lowered into a cylindrical cobalt-60 gamma radiation source somewhat over two inches in diameter and thirteen inches in length. The uniform radiation intensity in the center of this source was 360,000 roentgens/hour. The samples were irradiated for 10.5 hours at room temperature. After irradiation, the samples were removed from the source and each polymer was isolated by slow precipitation in 15 volumes of methanol. It was then dried in vacuo and the molecular weight of each sample and the chlorine content of the last were determined. The results are described in Table I:

*Table I*

EFFECT OF SOLVENT AND CONCENTRATION ON THE RADIATION DEPOLYMERIZATION OF VISTANEX [1]

| Reaction Conditions | Molecular Weight of Product [2] | Chain Breaks/ Initial Vistanex Molecule [3] | Total Energy Required For Each Chain Break [4] (e.v.) | Utilization of Energy Fraction Delivered to Solvent [5] (Percent) |
|---|---|---|---|---|
| 3.0% in Hexane | 40,700 | 27 | 526 | 3 |
| 9.3% in Hexane | 43,700 | 25 | 185 | 7 |
| 25.0% in Hexane | 50,200 | 21 | 80 | 15 |
| 25.0% in CHCl₃ | 29,500 | [6] 37 | 46 | 50 |

[1] Dose = 3.8 mr./gm. of solution.
[2] Number average molecular weights (Initial = $1.13 \times 10^6$).
[3] Chain breaks/molecule = $\frac{\text{Initial Mol. Wt.}}{\text{Final Mol. Wt.}} - 1$
[4] Energy/chain break = $\frac{22.3 \times 10^{19}\ \text{e.v./gm.}}{\text{Initial No. of mols./gm.} \times \text{breaks/mol.}}$
[5] Assuming that energy fraction absorbed directly by polymer in solution will produce one break for each 29 e.v. as it does in the solid polymer.
[6] Analysis of product showed <0.10% Cl.

The data in Table I show that only a trace of chlorine was introduced into the product where chloroform was the solvent. It also shows the average number of chain breaks per molecule in each solvent, the total energy required for each of these chain breaks and the amount of energy initially delivered to the solvent which is transferred to the solute (causing polymer chain breaks). At low concentrations, the total amount of energy which must be delivered to the system for each chain break is very high (526 e.v./break at 3% in hexane vs. only 80 e.v./break at 25% concentration). This means that the overall utilization of energy is not favorable at low concentrations. Only 3% of the energy delivered initially to the hexane solvent appears as useful work (depolymerization) at a concentration of 3%, and increases to 15% utilization at 25% concentration.

Data on the energy utilization under comparable conditions in hexane and chloroform are compared in the following table:

*Table II*

RELATIVE EFFECTIVENESS OF VISTANEX DEPOLYMERIZATION IN VARIOUS SOLVENTS

| 25 Wt. Percent Vistanex Solutions in— | Initial Vistanex Mole Fraction | Solvent Radical Yield (Rad./100 e.v.) [1] | Utilization of Energy Delivered to Solvent (Percent) |
|---|---|---|---|
| Hexane | $2.5 \times 10^{-5}$ | 7.5 | 15 |
| CHCl₃ | $3.5 \times 10^{-5}$ | 40 | 50 |

[1] Determined in independent measurements using I₂ scavenger. (This method counts all radicals regardless of reactivity.)

The energy utilization in chloroform is considerably better than it is in hexane. (50% utilization versus only 15% in hexane.) The increased efficiency, however, does not depend directly on the radical yield of the solvent since, if it did, energy utilization would be even greater in $$CHCl_3 \left( \frac{15 \times 40}{7.5} = 80 \right)$$

than demonstrated by the above data.

Data and calculations tabulated below also show that differences in the energy utilization from one solvent to another are not due to any difference in the size which Vistanex molecules assume in these solvents. An extended configuration would be expected to favor easy energy transfer from the solvent, whereas a tightly coiled structure would hinder this process.

*Table III*

DIMENSION OF VISTANEX MOLECULES IN SOLUTION
[$M_N$ = 29,500]

| Solvent | Intrinsic Viscosity in Solvent | Polymer Extension in Solution[1] (cm.) |
| --- | --- | --- |
| Hexane | 0.362 | 2.1×10⁻⁶ |
| Chloroform | 0.360 | 2.1×10⁻⁶ |

[1] Calculated from the relation of P. J. Flory and T. G. Fox, Jr., JACS, 73, 1904 (1951).

$$\sqrt{\bar{r^2}} = \left( \frac{[\eta] M_n}{\Phi} \right)^{1/3}$$

where:
$\sqrt{\bar{r^2}}$ = root mean square end to end distance.
$[\eta]$ = intrinsic viscosity.
$\Phi$ = 2.2×10²¹ (independent of $M_N$ and solvent).
$M_N$ = number average molecular weight.

The intrinsic viscosity of Vistanex is exactly the same in both hexane and chloroform. Since the dimensions of a given polymer (expressed as the root mean square end to end distance) are directly proportional to the intrinsic viscosity, it follows that the Vistanex molecules are extended to the same extent in both solvents. Thus, exactly the same opportunity is afforded in each solvent for energy transfer to the polymer. The greater efficiency observed in $CHCl_3$ is therefore due entirely to its unique nature and the number of active radicals produced from this solvent by irradiation.

EXAMPLE 2

The following process shows the effect of using a halogenating as well as a depolymerizing solvent. The data summarized in the following table compare the results obtained when two samples of Vistanex, differing in initial molecular weight, are irradiated in chloroform, carbon tetrachloride or bromotrichloromethane solution. After a dose of 3.8 megaroentgens, the molecular weight of the polymer products was determined by viscosity measurements in diisobutylene and the number average molecular weight was calculated using the Flory relation between number average molecular weight and viscosity average molecular weight. To ensure that no solvent remained in the solid product the polymer was redissolved and reprecipitated until a constant bromine or chlorine analysis was obtained.

*Table IV*

IRRADIATION OF VISTANEX
[Radiation dose = 3.8 mr. over 10.5 hours at 25° C.]

| Run # | Radiation Dose (mr.) | Product Properties | | |
| --- | --- | --- | --- | --- |
| | | Percent Br | Percent Cl | Molecular Weight [1] |
| (1) Vistanex | 0 | | | 1,130,000 |
| (2) 25% Vistanex in $CHCl_3$ | 3.8 | | <0.1 | 29,500 |
| (3) 25% Vistanex in $CBrCl_3$ | 3.8 | [2] 1.55 | <0.1 | 33,000 |
| (4) Vistanex | 0 | | | 870,000 |
| (5) 4% Vistanex in $CCl_4$ | 3.8 | | [3] 2.66 | 9,200 |
| (6) 4% Vistanex in $CBrCl_3$ | 3.8 | [4] 9.94 | <0.1 | 10,100 |

[1] Number average molecular weight ($M_N$) calculated from the following relation with viscosity average molecular weight ($M_V$)

$$M_V = 1.83 M_N$$

and

Intrinsic viscosity in diisobutylene = 3.64×10⁻⁴($M_V$)⁰·⁶⁴

[2] 6.4 atoms Br per molecule ($M_N$ = 33,000).
[3] 6.9 atoms Cl per molecule ($M_N$ = 9,200).
[4] 12.5 atoms Br per molecule ($M_N$ = 10,100).

Referring to the data in Table IV, no halogen at all was substituted on Vistanex polymer in run #2 when irradiated in chloroform. In run #3 with bromotrichloromethane, each product polymer molecule contained 1.55% Br, corresponding to about 6 bromine groups per molecule. Despite this difference in substitution, the rate of depolymerization was very nearly the same in both solvents. In fact the final molecular weights were equivalent for the same dose. If substitution occurred only on the active sites resulting from each break in the polymer backbone, then only 2 bromine groups would be found in each product molecule (one at each end). On the other hand, if each break occurred only as the result of a substitution reaction, then the rate of depolymerization should be considerably higher in bromotrichloromethane than in chloroform because the extent of substitution is much greater. Since neither is true, substitution of new groups on a polymer in solution, and its depolymerization must be two separate processes.

The last three runs in Table III show again that the rate of depolymerization is greater in more dilute solutions and that when $CBrCl_3$ is the solvent, bromine substitution in the product is considerably greater if the reaction is carried out at a lower concentration. Up to 9.94 wt. percent bromine (corresponding to about 12 bromine groups per molecule) can be introduced under these conditions.

Finally, a comparable run (run #5) in carbon tetrachloride solvent demonstrates its use as a chlorinating solvent. Here 2.66 wt. percent Cl (corresponding to about 7 chlorine groups per molecule) was introduced into the polymeric product. Again the rate of depolymerization (at the same concentration) is very nearly the same with both solvents.

EXAMPLE 3

Example 2 is repeated with 4% and 25% solutions of isoprene-isobutylene butyl rubber, having a viscosity average molecular weight of 250,000 and a mole percent unsaturation of 2, and a solid copolymer of isobutylene and styrene made with 40 wt. percent styrene and 60 wt. percent isobutylene. The solutions, made with chloroform, carbon tetrachloride or bromotrichloromethane, are irradiated to effect substantially the same results as set forth in the previous examples, viz. selective depolymerization, chlorination or bromination of the polymeric product, respectively. The extent of depolymerization and halogenation depends on the amount of radiation. The halogenated products can easily be cured or vulcanized with conventional curing agents, such as zinc oxide. The cured polymers may be used in tires, hoses, belts, etc.

It is not intended to restrict the present invention to the foregoing examples which are given merely to demonstrate some of the embodiments of the invention. It should only be limited by the appended claims in which it is intended to claim all the novelty inherent in the invention as well as all of the modifications and equivalents coming within the scope and spirit of the invention.

What is claimed is:

1. Method of modifying an isobutylene-containing polymer having a viscosity average molecular weight of at least 5,000 which comprises exposing a mixture of 1 to 95 wt. percent of said polymer and 99 to 5 wt. percent of a saturated liquid halogen-containing organic compound having the formula:

$$C_aH_bX_c$$

in which C is carbon, H is hydrogen, X is halogen, "$a$" is 1 to 6, "$b$" is 0 to 13 and "$c$" is 1 to 14, to ionizing high energy radiation for a sufficient time to reduce the molecular weight of said polymer; the dose rate of said radiation being at least $1 \times 10^{-4}$ kwh. per lb. of reactant per hour.

2. Method of modifying an isobutylene-containing polymer having a viscosity average molecular weight of 5,000 to 6,000,000 in which said isobutylene comprises at least 5 wt. percent of the monomers in said polymer which comprises exposing a mixture containing 1 to 95 wt. percent of said polymer dissolved in 99 to 5 wt. percent of a saturated halogen-containing organic liquid compound having the formula:

$$C_aH_bX_c$$

in which C is carbon, H is hydrogen, X is halogen, "$a$" is 1 to 6, "$b$" is 0 to 13 and "$c$" is 1 to 14, to high energy gamma radiation for a sufficient time to reduce the molecular weight of said polymer by at least 1%; the dose rate of said radiation being at least $1 \times 10^{-4}$ kwh. per lb. of reactant per hour.

3. Method according to claim 2 in which the saturated halogen-containing organic compound is perhalogenated and the irradiated polymer contains combined halogen.

4. Method according to claim 3 in which the halogen-containing organic compound is bromotrichloromethane.

5. Method according to claim 3 in which the halogen-containing organic compound is carbon tetrachloride.

6. Method according to claim 2 in which the halogen-containing organic compound is chloroform.

7. Method of modifying polyisobutylene having a viscosity average molecular weight of 5,000 to 2,000,000 which comprises exposing a 1 to 50 wt. percent solution of said polyisobutylene in a saturated liquid halogen-containing organic compound having the formula:

$$C_aH_bX_c$$

in which C is carbon, H is hydrogen, X is halogen, "$a$" is 1, "$b$" is 0 to 1 and "$c$" is 3 to 4, to high energy gamma radiation for a sufficient time to reduce its molecular weight at least 1%; the dose rate of said radiation being at least $1 \times 10^{-4}$ kwh. per lb. of reactant per hour.

8. Method according to claim 7 in which the halogen-containing organic compound is bromotrichloromethane and the irradiated polymer contains about 0.5 to 10 wt. percent combined bromine.

9. Method according to claim 7 in which the halogen-containing organic compound is chloroform and the irradiated polymer contains less than 0.1 wt. percent combined halogen.

References Cited in the file of this patent

FOREIGN PATENTS 546,817  Belgium ---------------- Oct. 6, 1956

OTHER REFERENCES

Bovey: Effects of Ionizing Radiation on Natural and Synthetic High Polymers, 1958, pages 114–120.

Bourne et al.: Chemistry and Industry, November 1956, pages 1372–76.